US012759510B2

(12) United States Patent
Shi

(10) Patent No.: US 12,759,510 B2
(45) Date of Patent: Oct. 13, 2026

(54) CONVEYING TRACK APPLIED TO UNATTENDED TUNNEL TYPE CAR WASHING MACHINE

(71) Applicant: Zhejiang Yigoli Intelligent Technology Co., Ltd., Hangzhou (CN)

(72) Inventor: Hengzhi Shi, Hangzhou (CN)

(73) Assignee: Zhejiang Yigoli Intelligent Technology Co., Ltd., Hangzhou (CN)

( * ) Notice: Subject to any disclaimer, the term of this patent is extended or adjusted under 35 U.S.C. 154(b) by 455 days.

(21) Appl. No.: 18/499,572

(22) Filed: Nov. 1, 2023

(65) Prior Publication Data

US 2024/0067137 A1 Feb. 29, 2024

(30) Foreign Application Priority Data

Mar. 31, 2023 (CN) ......................... 202320729341.7

(51) Int. Cl.
*B60S 3/00* (2006.01)
*B65G 17/06* (2006.01)
*B65G 17/08* (2006.01)

(52) U.S. Cl.
CPC ................. *B60S 3/004* (2013.01); *B60S 3/00* (2013.01); *B65G 17/063* (2013.01); *B65G 17/064* (2013.01); *B65G 17/08* (2013.01); *B65G 17/083* (2013.01)

(58) Field of Classification Search
CPC .......... B60S 3/004; B60S 3/00; B65G 17/063; B65G 17/064; B65G 17/08; B65G 17/083
USPC ................................ 104/172.1, 172.3, 172.5
See application file for complete search history.

(56) References Cited

U.S. PATENT DOCUMENTS 1,792,533 A * 2/1931 Earle ........................ B61B 10/04 104/178
1,907,636 A * 5/1933 Woodman ............ B65G 17/083 474/229
3,590,745 A * 7/1971 Ouska .................. B65G 17/066 104/172.3
3,815,725 A * 6/1974 Linderman .......... B65G 17/063 198/851

(Continued)

FOREIGN PATENT DOCUMENTS

CN 108909679 A * 11/2018 .............. B60S 3/004
CN 111670152 A * 9/2020 ............. B65G 17/08

(Continued)

*Primary Examiner* — S. Joseph Morano
*Assistant Examiner* — James William Jones
(74) *Attorney, Agent, or Firm* — Hemisphere Law, PLLC

(57) ABSTRACT

The present disclosure relates to a conveying track applied to an unattended tunnel type car washing machine. The conveying track includes a front conveying track section, a middle conveying track section, and a rear conveying track section, which are sequentially connected; where a transition roller is arranged between two adjacent conveying track sections; in each conveying track section, a track frame is used as an integral support on one separate side, and a chain plate formed by splicing a metal steel pipe and a chain is used as a rotary chain plate on one separate side; and two rotary chain plates are driven by a same driving reduction motor, and the driving reduction motor is in driving connection with the two rotary chain plates through a driving shaft. The present disclosure has higher strength and a lower cost.

8 Claims, 7 Drawing Sheets

(56) References Cited

U.S. PATENT DOCUMENTS

| | | | | | |
|---|---|---|---|---|---|
| 3,991,876 | A * | 11/1976 | Schmidt, Sr | B65G 17/063 198/848 |
| 5,054,609 | A * | 10/1991 | Poerink | B65G 17/063 198/852 |
| 7,467,706 | B2 * | 12/2008 | Nothum | B65G 21/2054 198/465.4 |
| 2008/0028974 | A1 * | 2/2008 | Bianco | B60S 3/04 104/165 |
| 2009/0288930 | A1 | 11/2009 | Schäfer | |
| 2011/0035919 | A1 | 2/2011 | DeGennaro, Jr. | |
| 2013/0033715 | A1 * | 2/2013 | Takasaki | G03G 15/6573 358/1.12 |
| 2017/0044722 | A1 | 2/2017 | Schenk et al. | |
| 2021/0323772 | A1 * | 10/2021 | Henze | G05B 19/4189 |

FOREIGN PATENT DOCUMENTS

| | | | | |
|---|---|---|---|---|
| CN | 113147687 A | * | 7/2021 | B60S 3/004 |
| CN | 113682797 A | * | 11/2021 | B65G 17/063 |
| CN | 216102025 U | * | 3/2022 | |
| JP | H1035429 A | * | 2/1998 | |

* cited by examiner

CONVEYING TRACK APPLIED TO UNATTENDED TUNNEL TYPE CAR WASHING MACHINE

BACKGROUND OF THE PRESENT INVENTION

Technical Field

The present disclosure relates to the technical field of car washing machines, and in particular to a conveying track applied to an unattended tunnel type car washing machine.

Description of Related Art

An unattended tunnel type car washing machine, a type of automatic vehicle washing apparatus, works in a similar way to that of a conventional tunnel type car washing machine in the absence of manual operation. Such a washing machine typically consists of a long tunnel and a series of automated apparatuses, including water spray guns, brushes, air curtains, air suction devices, etc.

With the unattended tunnel type car washing machine, a car owner needs do no more than park a car at an entrance, and pay by pressing a button or scanning a two-dimensional code. The car washing machine will then be automatically turned on to clean the exterior of the car. The car is cleaned by the automated apparatus while passing through the tunnel until it exits from an exit. An entire process is completely automated without manual participation.

At present, plastic chain plates produced in batches are employed as conveying tracks of the majority of the unattended tunnel type car washing machines, such as the unattended tunnel type car washing machine described in Chinese Patent No. CN216102025U. The plastic chain plate is formed by assembling plastic blocks in various shapes and sizes. In consequence, a variety of plastic molds are required and a mold making cost is high. Moreover, owing to low plastic strength, a support plate is employed to withstand great pressure from car tires. The fixed support plate and the slidable chain plate lead to abrasion and a high use cost, which limits popularization and application to certain markets.

Therefore, it's a pressing issue to develop a conveying track which can improve support strength and reduce a cost for an unattended tunnel type car washing machine.

SUMMARY OF THE PRESENT INVENTION

Aiming at the above problems in the prior art, an objective of the present disclosure is to provide a conveying track applied to an unattended tunnel type car washing machine.

In order to realize the above objective of the present disclosure, the present disclosure employs the technical solution as follows: a conveying track applied to an unattended tunnel type car washing machine includes a front conveying track section, a middle conveying track section, and a rear conveying track section, which are sequentially connected; where a transition roller is arranged between two adjacent conveying track sections; in each conveying track section, a track frame is used as an integral support on one separate side, and a chain plate formed by splicing a metal steel pipe and a chain is used as a rotary chain plate on one separate side; and two rotary chain plates are driven by a same driving reduction motor, and the driving reduction motor is in driving connection with the two rotary chain plates through a driving shaft.

Working principles and beneficial effects are as follows:

1. Compared with the prior art, in the present disclosure, an original plastic chain plate is replaced by a metal chain plate having higher strength; although the metal material has a higher cost and a lower processing speed than a plastic injection-molded in batches, the metal has higher structural strength, a simpler structure, and greater abrasive resistance; moreover, a conventional material is used, which has a short production and supply cycle; more importantly, it is not required to provide a support plate for withstanding, so that the structure is obviously simplified, and the cost is reduced as a whole; and the metal chain plate has better maintainability and a lower maintenance cost than the plastic, while an entire plastic chain plate has to be replaced once damaged, leading to a higher maintenance cost.

2. Compared with the prior art, the rotary chain plate of the present disclosure is of a structure formed by splicing the metal steel pipe and the chain, and has a simpler structure and lower processing difficulty than the plastic chain plate in Prior Patent No. CN216102025U; and it is not required to provide the aforementioned support plate, which is further conducive to popularization and application to certain markets.

Further, the rotary chain plate includes rectangular steel pipes and chains detachably connected to the rectangular steel pipes, where the chains are arranged at a left end and a right end of each rectangular steel pipe respectively and connected to the driving shaft through chain wheels.

Through such an arrangement, the rectangular steel pipes can be replaced independently, and thus have lower assembly and disassembly difficulty and better maintainability than an existing plastic chain plate.

Further, some rectangular steel pipes of each rotary chain plate are provided with stop blocks, where the stop blocks are arranged at uniform intervals in a length direction of the rectangular steel pipes, and a limiting interval for stopping car wheels is formed between two adjacent rectangular steel pipes provided with the stop blocks.

With such an arrangement, a car can be effectively prevented from slipping at a transition between two conveying track sections.

Further, the track frames and the rectangular steel pipes are hot-dip galvanized.

With such an arrangement, a zinc layer formed on a hot-dip galvanized surface can effectively protect steel against corrosion and oxidation, so as to prolong the service life of the steel. Accordingly, the track frames and the rectangular steel pipes can be prevented from being corroded by car washing solutions such as weak acid and weak base while withstanding great pressure from car tires repeatedly.

Further, a guide sliding bar is arranged on each track frame, and guide pulleys matching the guide sliding bar are arranged on some metal steel pipes. Therefore, the rotary chain plate can be prevented from deflecting transversely.

Further, a counting disc is arranged on the driving shaft, and corresponding sensors are arranged on the track frames to count pulses.

Further, a plurality of grounding legs are arranged on each track frame at uniform intervals in a length direction of the track frame and configured to be mounted on ground. Accordingly, a capital construction cost caused by digging a foundation pit in the ground and sunken type mounting can be omitted.

Further, a left side and a right side of the front conveying track section are provided with limiting rollers respectively. The wheels are limited in the track, so that the car is prevented from being parked at an improper position and touching the car washing machine after entering the car washing machine.

Further, a left side and a right side of each track frame are encapsulated and pre-configured with access ports respectively. The track frame is high in integrity and suitable for being mounted on the ground.

In the figures: 1. front conveying track section; 2. middle conveying track section; 3. rear conveying track section; 4. transition roller; 7. track frame; 8. rotary chain plate; 9. driving reduction motor; 10. driving shaft; 11. limiting roller; 51. car alignment sliding table; 52. alignment tension spring; 53. guide roller; 71. grounding leg; 72. access port; 73. guide sliding bar; 81. rectangular steel pipe; 82. chain; 83. stop block; and 84. guide pulley.

DETAILED DESCRIPTION OF THE PREFERRED EMBODIMENT

The technical solutions in examples of the present disclosure are clearly and completely described below with reference to the accompanying drawings in the examples of the present disclosure. Apparently, the described examples are merely some examples rather than all examples of the present disclosure. Based on the examples of the present disclosure, all other examples derived by those of ordinary skill in the art fall within the scope of protection of the present disclosure.

Those skilled in the art should understand that in the description of the present disclosure, the orientation or position relations indicated by the terms “longitudinal”, “transverse”, “up”, “down”, “front”, “rear”, “left”, “right”, “vertical”, “horizontal”, “top”, “bottom”, “inside”, “outside”, etc. are based on the orientation or position relations shown in the accompanying drawings, and are merely for facilitating the description of the present disclosure and simplifying the description, rather than indicating or implying that the device or element referred to must have a particular orientation or be constructed and operated in a particular orientation, and therefore the above terms cannot be interpreted as limiting the present disclosure.

Figure 1:
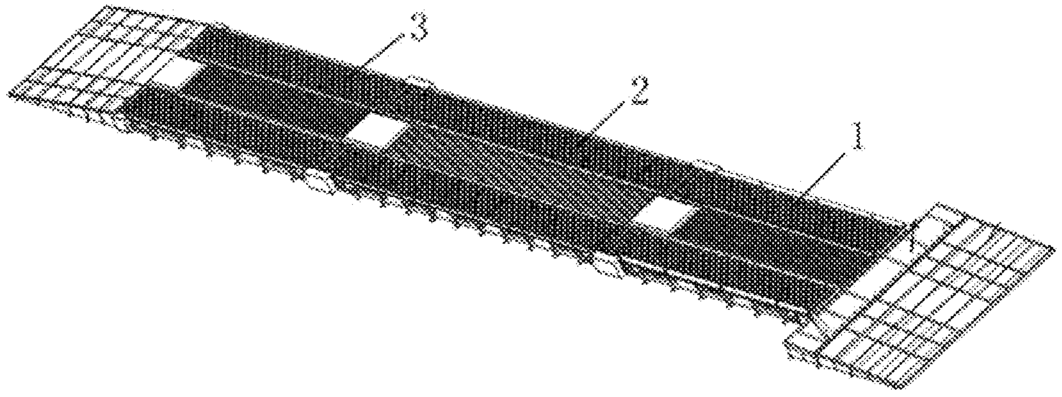
FIG. 1 is a schematic structural diagram of the present disclosure.
Figure 2:
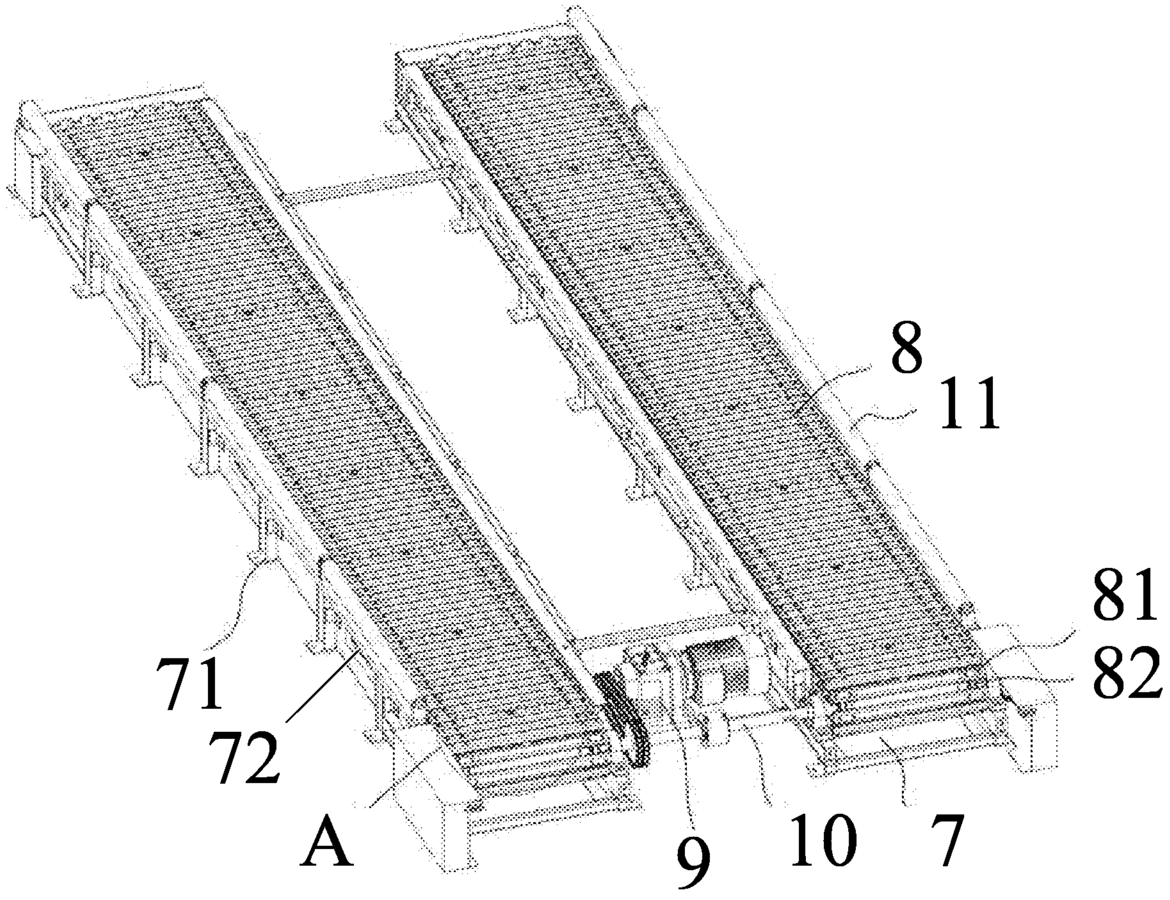
FIG. 2 is a schematic diagram of a front conveying track section.
Figure 3:
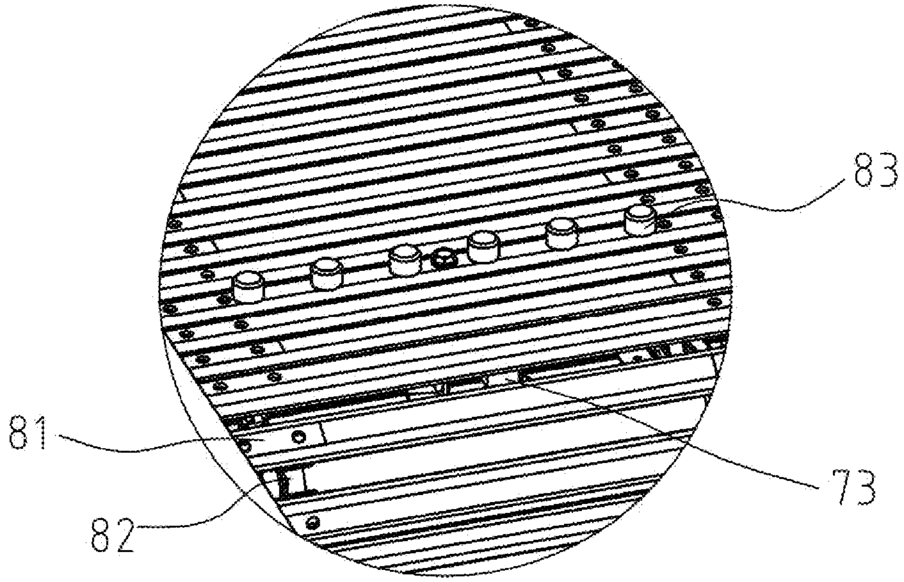
FIG. 3 is an enlarged diagram of A in FIG. 2.
Figure 4:
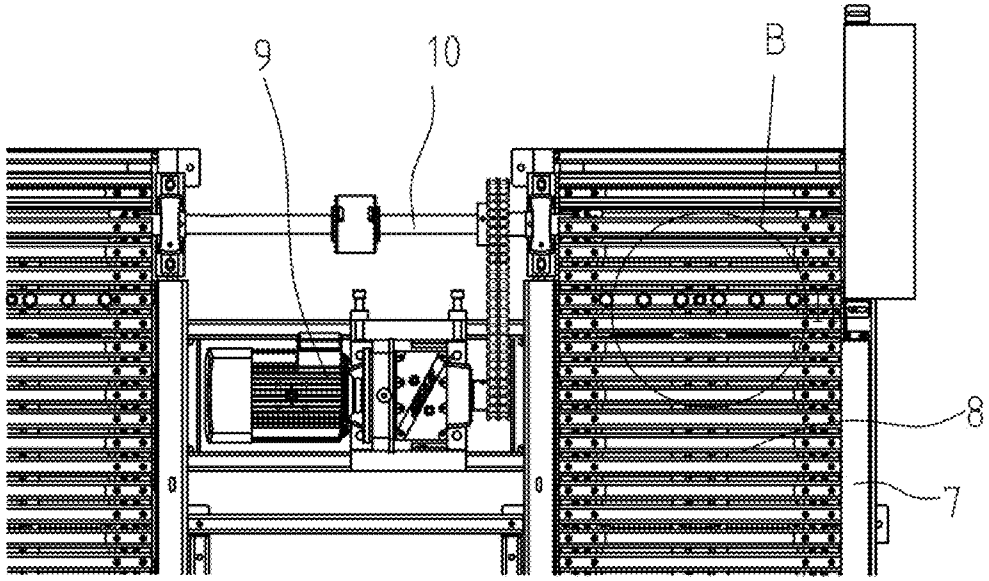
FIG. 4 is a partial structural diagram of a front conveying track section.
Figure 5:
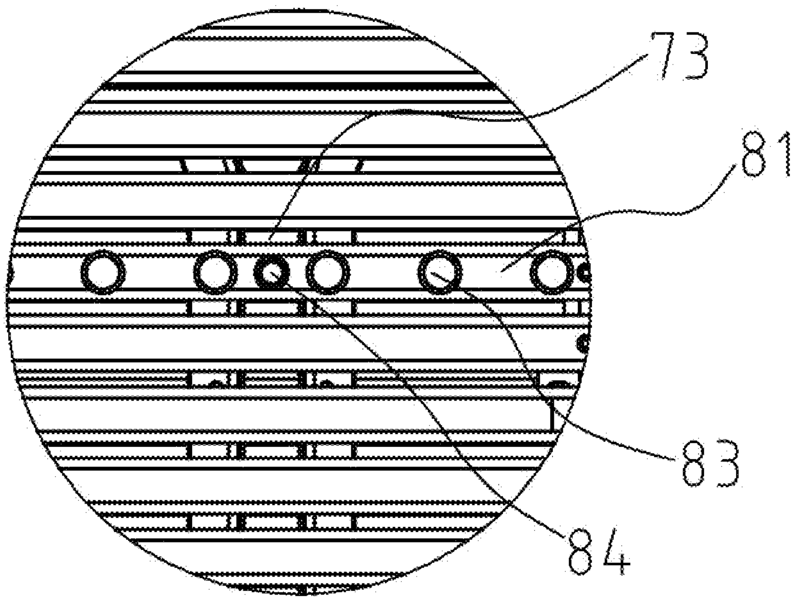
FIG. 5 is an enlarged diagram of B in FIG. 4.
Figure 6:
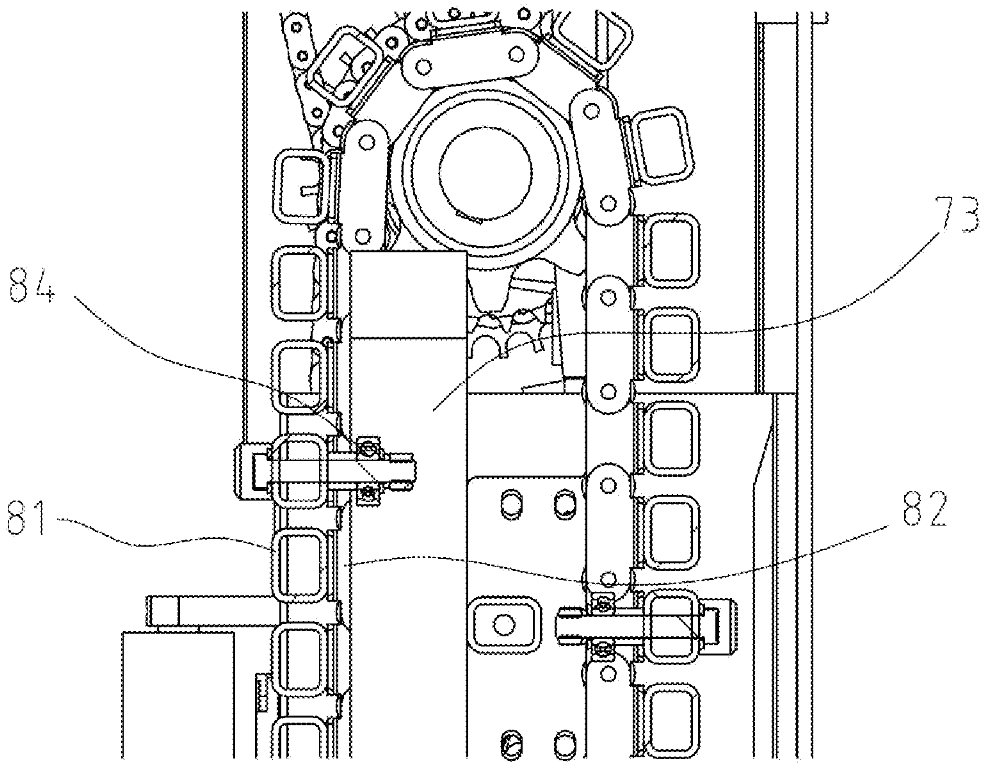
FIG. 6 is a schematic diagram showing matching between a guide pulley and a guide sliding bar.
Figure 7:
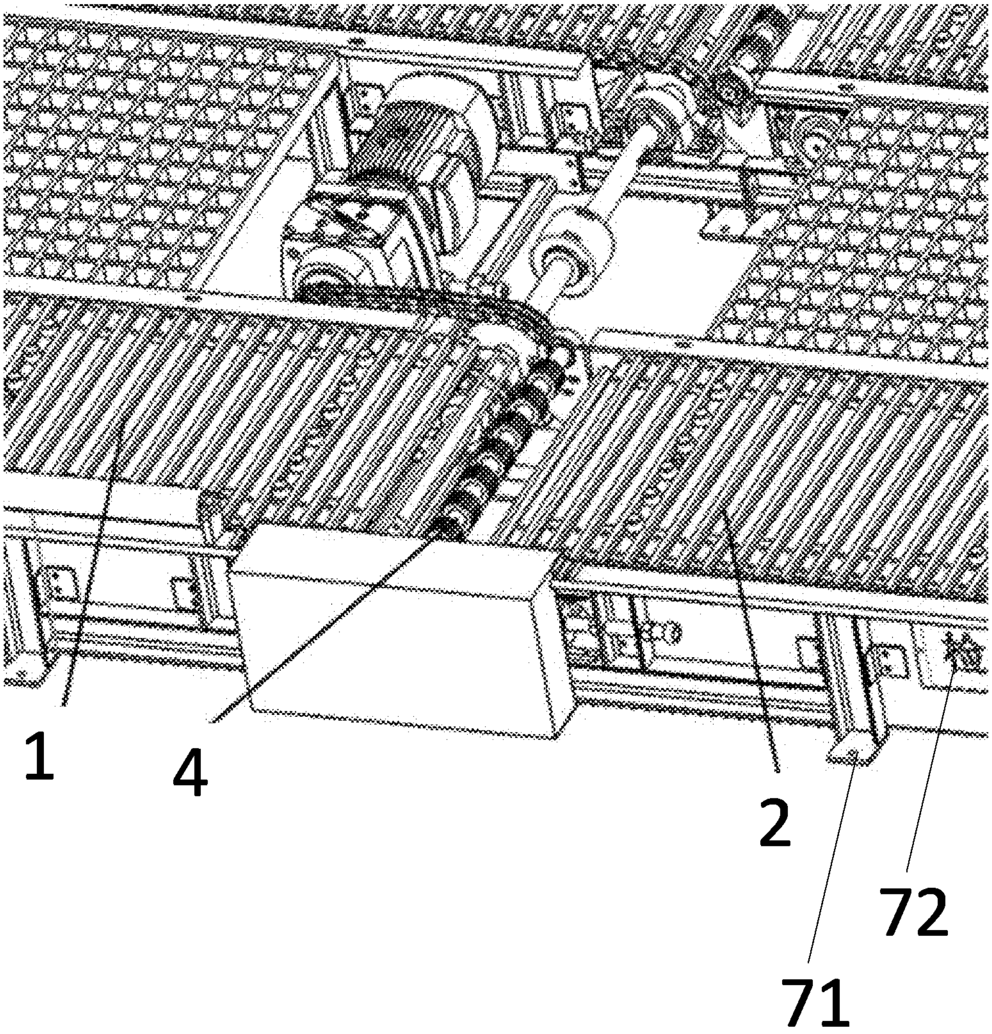
FIG. 7 is a schematic diagram of a transition roller.

As shown in FIG. 1 and FIG. 7, a conveying track applied to an unattended tunnel type car washing machine includes a front conveying track section 1, a middle conveying track section 2, and a rear conveying track section 3, which are sequentially connected; where a transition roller 4 is arranged between two adjacent conveying track sections.

As shown in FIGS. 1-7, the conveying track of the present disclosure has substantially the same structure as that in Prior Patent No. CN216102025U, except for the following improvements:

In each conveying track section, a track frame 7 is used as an integral support on one separate side, and a chain plate formed by splicing a metal steel pipe and a chain 82 is used as a rotary chain plate 8 on one separate side; and two rotary chain plates 8 are driven by a same driving reduction motor 9, and the driving reduction motor 9 is in driving connection with the two rotary chain plates 8 through a driving shaft 10.

In the present example, the rotary chain plate 8 includes rectangular steel pipes 81 and chains 82 detachably connected to the rectangular steel pipes 81 through threaded fasteners, where the chains 82 are arranged at a left end and a right end of each rectangular steel pipe 81 respectively and connected to the driving shaft 10 through chain wheels. Therefore, compared with a plastic chain plate in the prior patent, with such an arrangement, the rectangular steel pipes 81 can be replaced independently, and thus have lower assembly and disassembly difficulty and better maintainability.

A driving mode is basically the same as that in the prior patent, except that in the present disclosure, the driving shaft 10 is connected to the chains 82 through the chain wheels.

Preferably, the track frames 7 and the rectangular steel pipes 81 are hot-dip galvanized, and the track frame 7 is also made of steel. A zinc layer formed on a hot-dip galvanized surface can effectively protect the steel against corrosion and oxidation, so as to prolong the service life of the steel. Accordingly, the track frames and the rectangular steel pipes can be prevented from being corroded by car washing solutions such as weak acid and weak base while withstanding great pressure from car tires repeatedly.

Preferably, a plurality of grounding legs 71 are arranged on each track frame 7 at uniform intervals in a length direction of the track frame and configured to be mounted on ground. A left side and a right side of each track frame 7 are encapsulated and pre-configured with access ports 72 respectively. The track frame is high in integrity and suitable for being mounted on the ground. Accordingly, a capital construction cost caused by digging a foundation pit in the ground and sunken type mounting can be omitted. Moreover, the track frame is convenient to maintain.

As a preferred improvement, in the present example, some rectangular steel pipes 81 of each rotary chain plate 8 are provided with stop blocks 83, where the stop blocks 83 are arranged at uniform intervals in a length direction of the rectangular steel pipes 81, and a limiting interval for stopping car wheels is formed between two adjacent rectangular steel pipes 81 provided with the stop blocks 83. This part is an improvement not proposed in the prior patent, which can effectively prevent the car from slipping at a transition between two conveying track sections.

As a preferred improvement, in the present example, a guide sliding bar 73 is arranged on each track frame 7, and guide pulleys 84 matching the guide sliding bar 73 are arranged on some metal steel pipes. Therefore, the rotary chain plate 8 can be prevented from deflecting transversely.

As a preferred improvement, in the present example, a counting disc is arranged on the driving shaft 10, and corresponding sensors are arranged on the track frames 7 to count pulses. The sensors and the counting disc herein are those in the prior art, and specific principles and mounting positions as well as methods are technical means well known to those skilled in the art, which will not be repeated herein.

The parts not described in detail in the present disclosure are those in the prior art, which will not be repeated herein.

It can be understood that the terms “a” and “an” should be interpreted as “at least one” or “one or more”, i.e., an element may be provided in an example, while a plurality of elements may be provided in another example. The terms "a" and "an" should not be interpreted as limiting the quantity.

Although the terms such as the front conveying track section 1, the middle conveying track section 2, the rear conveying track section 3, the transition roller 4, the track frame 7, the rotary chain plate 8, the driving reduction motor 9, the driving shaft 10, the limiting roller 11, the grounding leg 71, the access port 72, the guide sliding bar 73, the rectangular steel pipe 81, the chain 82, the stop block 83, and the guide pulley 84 are used frequently herein, the possibility of using other terms is not excluded. These terms are used only for further facilitating description and explanation of the nature of the present disclosure. Interpreting these terms as any additional limitations will be contrary to the spirit of the present disclosure.

The present disclosure is not limited to the above optimal embodiments, and anyone can derive other products in various forms under the inspiration of the present disclosure. However, any technical solution identical or similar to that of the present disclosure falls within the scope of protection of the present disclosure regardless of any change in shape or structure.

What is claimed is:

1. A conveying track applied to an unattended tunnel type car washing machine, comprising a front conveying track section, a middle conveying track section, and a rear conveying track section, which are sequentially connected; wherein an exit of the rear conveying track section is provided with a car exit slope;

in each conveying track section, a track frame is used as an integral support on one separate side, and a chain plate formed by splicing a metal steel pipe and a chain is used as a rotary chain plate on one separate side; and two rotary chain plates are driven by a same driving reduction motor, and the driving reduction motor is in driving connection with the two rotary chain plates through a driving shaft;

wherein the rotary chain plate comprises rectangular steel pipes; some rectangular steel pipes of each rotary chain plate are provided with stop blocks, the stop blocks are arranged at uniform intervals in a length direction of the rectangular steel pipes, and a limiting interval for stopping car wheels is formed between two adjacent rectangular steel pipes provided with the stop blocks.

2. The conveying track applied to an unattended tunnel type car washing machine according to claim 1, wherein the rotary chain plate further comprises chains detachably connected to the rectangular steel pipes, and the chains are arranged at a left end and a right end of each rectangular steel pipe respectively and connected to the driving shaft through chain wheels.

3. The conveying track applied to an unattended tunnel type car washing machine according to claim 1, wherein the track frames and the rectangular steel pipes are hot-dip galvanized.

4. The conveying track applied to an unattended tunnel type car washing machine according to claim 1, wherein a guide sliding bar is arranged on each track frame, and guide pulleys matching the guide sliding bar are arranged on some metal steel pipes.

5. The conveying track applied to an unattended tunnel type car washing machine according to claim 1, wherein a counting disc is arranged on the driving shaft, and corresponding sensors are arranged on the track frames to count pulses.

6. The conveying track applied to an unattended tunnel type car washing machine according to any one of claims 1-2 and 3-5, wherein a plurality of grounding legs are arranged on each track frame at uniform intervals in a length direction of the track frame and configured to be mounted on ground.

7. The conveying track applied to an unattended tunnel type car washing machine according to any one of claims 1-2 and 3-5, wherein a left side and a right side of the front conveying track section are provided with limiting rollers respectively.

8. The conveying track applied to an unattended tunnel type car washing machine according to any one of claims 1-2 and 3-5, wherein a left side and a right side of each track frame are encapsulated and pre-configured with access ports respectively.

* * * * *